Patented Nov. 2, 1926.

1,605,180

UNITED STATES PATENT OFFICE.

HARRY L. FISHER, OF AKRON, OHIO, ASSIGNOR TO THE B. F. GOODRICH COMPANY, OF NEW YORK, N. Y., A CORPORATION OF NEW YORK.

RUBBER ISOMER AND METHOD OF PRODUCING THE SAME.

No Drawing. Application filed December 26, 1924, Serial No. 758,099, and in Great Britain September 24, 1924.

This invention relates to methods of producing derivatives of rubber by acting thereon with reagents capable of changing the condition of the rubber, and to the products of such reaction.

My object is to provide a new class of rubber derivatives having properties adapting them for a number of useful purposes such as the manufacture of molded electrical insulations and other molded goods, belting, phonograph records and other goods heretofore commonly made of gutta percha, balata, shellac and similar materials. A more specific object is to provide inexpensive homogeneous or uniform derivatives of rubber, and particularly heat-plastic derivatives, and so to control the process of manufacture as to obtain products having desired properties lying within a considerable range of variation.

This application is a continuation in part of my prior applications Serial No. 616,178, filed January 31, 1923, 686,202, filed January 14, 1924, 688,899, filed January 17, 1924, and 706,267, filed April 14, 1924, which describe the use of various rubber-converting reagents having the general formula $R-SO_2-X$ wherein R represents an organic radical or a hydroxy group and X represents a hydroxy group or chlorine, such reagents including sulfuric acid, organic sulfonic acids and organic sulfonyl chlorides or mixtures thereof. The purpose of the present application is to cover broadly the novel methods of procedure common to said prior applications, or set forth more or less fully in particular ones, as well as the general and particular characteristics of the new products resulting therefrom.

While it has previously been known in a general way that sulfuric acid, either alone or with modifying agents such as turpentine or benzene, will react with rubber to change its state, yet the methods employed have been so cumbersome and the products obtained so uncertain or lacking in uniformity that this prior knowledge has failed, so far as I am aware, to yield practical, commercial results. This is especially true of those methods which effect the reaction with the rubber in solution, which are not only cumbersome, slow and expensive in their incidents of dissolving the rubber and freeing the reaction product of solvent and acid, but their products are in general different and less desirable than those of my present invention, and less controllable as to range of properties. The products of prior methods of reacting undissolved rubber in a mold, with an acid resin formed with sulfuric acid and turpentine or benzene, for the purpose of obtaining a molded hard-rubber substitute, are apt to be porous and non-uniform as to the extent of the reaction in the interior and exterior portions of the mass.

I find that by mixing rubber with reagents of the type mentioned I am able to obtain (a) products which are resilient or elastic and similar in some respects to ordinary soft, vulcanized rubber; (b) harder, tough, heat-plastic products more or less resembling balata and suitable for many uses similar to those of balata; or (c) hard, friable products which soften or fuse at low temperatures and which are similar in many respects to shellac, for which they may be substituted in many compositions such as those of phonograph records, molded electric insulators, or the like.

A mass of undissolved rubber is thoroughly masticated, for example on an ordinary roller mill, and the reagent is added directly to the rubber during working on the mill. When the reagent has been thoroughly dispersed throughout the rubber, the mixture is removed from the mill and heated in an oven, or otherwise, preferably (though not in all cases) under such conditions as to permit the free escape of gases during the ensuing reaction, the temperature being in most cases raised to such a point that a pronounced exothermal reaction is produced. The heating should preferably be maintained throughout the exothermal reaction and may or may not be continued after it has subsided, further heating in the presence of residual reagent in the mix resulting in slowly carrying forward the reaction. The product is then cooled, preferably in the oven with the source of heat withdrawn. After removal from the oven the product is masticated on a warm mill to homogenize it and it may be washed free of remaining acid and other water-soluble impurities during that process. I may also employ various other methods of reworking the product for industrial use, as hereinafter pointed out, without substantially changing its chemical characteristics, as by comminution, solution or other means of homogenizing the product.

Reagents capable of employment in my process include, as above indicated, organic sulfonyl chlorides, organic sulfonic acids and sulfuric acid, although the invention is not necessarily restricted to these. Simple organic sulfonyl chlorides such as those of benzene, napthalene, p-toluene, nitro-benzene, and p-dichloro-benzene have been found to give satisfactory results in the above procedure. Organic sulfonic acids such as benzene sulfonic acid, p-toluene sulfonic acid, p-phenol sulfonic acid, sulfo-salicylic acid, 2, 5-dichloro-benzene sulfonic acid, ethyl sulfonic acid, 2-chloro-toluene-5-sulfonic acid or other operative derivatives which contain an available sulfonic acid group, likewise give satisfactory products.

The reactions which are effected by sulfonic acids on rubber are evidently due to the presence of a free sulfonic acid group, as any change in the composition of the sulfonic acid which tends to neutralize or decrease its acidic properties has been found to decrease or entirely prevent a reaction with rubber to produce the desired products. For example, salts, esters, amides or imides of sulfonic acids, such as sodium p-toluene sulfonate, methyl p-toluene sulfonate, p-toluene sulfonamide, or o-benzoic sulfinide do not give the reactions as above described for the three acids. It has also been found that the basic nitrogen-containing groups in such sulfonic acids as sulfanilic acid, o-nitroaniline-p-sulfonic acid or p-phenetidine sulfonic acid have the power of neutralizing the acidity of the sulfonic acid group and therefore such so-called sulfonic acids do not function in the above described reactions.

It is found, however, that ortho-sulfobenzoic acid anhydride, which contains no free sulfonic acid group apparently generates such a group after being mixed with rubber and subjected to heat. The hydrolysis of the anhydride to free sulfonic acid is probably due primarily to traces of water in the rubber and later to the liberation of water by the reaction of the acid on the rubber. Such an anhydride may be described as a potential sulfonic acid and gives reaction products with rubber similar to those described above. My invention is therefore not wholly confined to the use of substances which are active reagents prior to mixing with the rubber or which act in their original character after such mixing.

In carrying out the reactions described herein, it is found that lesser quantities of reagents are generally required and more satisfactory results obtained in some instances by the employment of two of the sulfonic compounds, such as a mixture of sulfuric acid and a sulfonic acid, sulfuric acid and a sulfonyl chloride or a sulfonyl chloride and a sulfonic acid.

*Example 1.*—As an example of the preparation of the elastic product, I mix 4 to 5 parts by weight of crude p-toluene sulfonic acid (or p-phenol sulfonic acid) into 100 parts of undissolved rubber. This may be done on a rubber mill after the usual fashion of making rubber mixes for ordinary vulcanization. This mixture is sheeted or otherwise formed and is then heated in an oven for 20 to 40 hours at 120° C. The product is resilient, slightly elastic and non-thermoplastic. When such heating is effected in air the product has a thin surface coat of oxidized material. This product is then reworked or masticated on a mill to make it thoroughly uniform and homogeneous.

The greatest utility of my invention, however, is believed to lie in the production of isomeric thermoplastic substances derived from rubber, which may be prepared as set forth in the following three examples.

*Example 2.*—For preparing a tough, balata-like product, 7½ parts by weight of p-phenol sulfonic acid are mixed directly into 100 parts of undissolved rubber while being worked on a rubber mill or otherwise, and when thoroughly mixed the material is removed from the mill and heated in a compact mass in an oven for 4 to 10 hours at 120° to 145° C. In about two to eight hours after starting the heating, depending on how rapidly the batch heats up, a pronounced exothermal reaction sets in, the temperature in the material rising to 200–230° C., and quantities of vapors and gases are given off. The heating should be continued for about two hours beyond the peak of the exothermal temperature rise.

Alternatively, one may employ, instead of the p-phenol sulfonic acid of the above example, any of the following (a) 4½ parts of concentrated sulfuric acid (b) p-toluene sulfonic acid-7½ parts, (c) p-phenol sulfonic acid-5 parts and concentrated sulfuric acid-1 part.

*Example 3.*—A somewhat harder, tough, balata-like product may be prepared as follows: mix 10 parts of p-toluene sulfonic acid with 100 parts of undissolved rubber. Thin slabs of the mix, preferably not more than ½ inch in thickness, are dusted with soapstone to prevent sticking, and heated in an oven for 48 hours at 110° C., followed by 48 hours at 120° C. Alternatively, the thin slab may be heated in a suitable mold to a temperature of 175° C. for 3 to 6 hours, or 150° C. for about 12 hours. Cooling in the mold under pressure may be employed to prevent porosity and facilitate removal from the mold. When p-phenal sulfonic acid is used, the heating is preferably for 6 hours at 110° C., followed by 16 hours at 130° C. The initial heating at a low temperature and the thinness of the mass contribute to the carrying off of heat and minimizing the rise in temperature during the exothermal reaction, otherwise the tendency would be to produce more or less of the shellac-like condition in the product, with the described reagents used in the proportion stated.

The character and amount of the reagent employed and the time and conditions of cure all have a considerable influence on the qualities of the product in the reactions here being considered.

The final step of mastication is particularly useful in producing a uniform product where the reaction has proceeded to different degrees in different parts of the mass.

These tough, non-friable, heat-plastic rubber derivatives, if washed free of acid, are more or less soluble in the ordinary rubber solvents. Their physical properties have been observed to be substantially as follows: specific gravity .97 to 1.00; smaller cold flow than gutta percha or balata; tensile strength at 22° C., 1000 to 5000 pounds per square inch; ultimate compressive strength about 3500 to 8000 pounds per square inch; ultimate transverse or shearing strength 6000 to 11000 pounds per square inch; impact strength (pendulum method) 4 to 50 inch-pounds per inch; dielectric strength at 25° C., 35,000 to 55,000 volts per mm.; softening temperature (tensile method) 55 to 105° C.; melting point somewhat indefinite but not substantially higher than 275° C.

*Example 4.*—To prepare a hard, brittle, pulverizable, shellac-like rubber derivative, masticate 100 parts of rubber on a mill and gradually add thereto during the working a mixture of 8 parts of p-toluene sulfonic acid, 2 parts concentrated sulfuric acid (sp. gr. 1.84), and 2 parts water. When the reagent has been thoroughly dispersed in the rubber, the latter is removed and heated in a thick mass in an oven for 8 hours at an oven temperature of 140° C. An exothermal reaction sets in, somewhat more energetic than in Example 2, and the temperature rises to 250° or higher. The weight loss represented in vapors and gases driven off during the reaction is approximately 6 to 7%. The source of heat is then cut off and the mixture permitted to cool in the oven.

Alternatively, for the p-toluene sulfonic acid and sulfuric acid of the above example, one may substitute (*a*) p-toluene sulfonyl chloride-11 parts, sulfuric acid-2 parts; (*b*) p-toluene sulfonyl chloride-9 parts, p-toluene sulfonic acid-2 parts; (*c*) p-toluene sulfonyl chloride-2 parts, p-toluene sulfonic acid-9 parts; (*d*) p-phenol sulfonic acid-11 parts, sulfuric acid-2 parts; (*e*) p-toluene sulfonyl chloride-12 parts; (*f*) p-toluene sulfonic acid-13 parts, or (*g*) p-phenol sulfonic acid-15 parts.

This hard, brittle product in thick sheets or lumps is an amorphous, brownish-black or jet-like body and breaks with a conchoidal fracture. It softens at 50 to 65° C., slowly changes to a viscous mass at 90 to 120° C. and melts at about 275° C. Such gradual softening under heat, which is characteristic also of the balata-like product, renders these heat-plastics exceptionally valuable for molding and other operations. As the softening point is not substantially changed by repeated heating within the range of plasticity nor by placing the material in solution, it is possible to rework these materials in a variety of ways, for industrial use, without altering their chemical characteristics. If the products are melted, however, these, as well as the physical characteristics are altered, the products becoming chemically less unsaturated, the balata-like product becoming brittle and more or less similar to the shellac-like product, and the shellac-like product when melted losing considerable of its strength.

The brittle, shellac-like product prepared as in Example 4 is soluble to a somewhat greater degree than crude rubber in the well-known rubber solvents such as benzene, p-cymene, gasoline, turpentine, "tetralin", "decalin", chloroform, carbon tetrachloride, carbon disulfide and molten camphor, but is practically insoluble in alcohol, ether, acetone, glacial acetic acid, amylacetate, aniline, water, dilute acids and alkalies. Its specific gravity is about .989 to 1.005. It is relatively stable under atmospheric conditions but is slowly attacked by concentrated sulfuric acid and is nitrated by strong nitric acid similarly to the original rubber from which it was prepared.

Its tensile strength compares favorably with shellac, ranging up to about 570 pounds per square inch, its impact strength is higher, its ultimate transverse or shearing strength is more than double, being of the order of 1800 to 2700 pounds per square inch as compared with about 870 for shellac, and its ultimate compressive strength is of the order of 10900 to 12000 pounds per square inch as compared with about 9000 for shellac. It has a dielectric strength of 52100 to 59200 volts per millimeter thickness, which places it above shellac in this respect and even above the best ebonite.

The rubber used in the above examples is preferably high-grade plantation sheet, but lower grades of plantation rubber and some of the wild rubbers may be successfully employed. Generally speaking, the lower the quality of the rubber, the higher is the proportion of reagent which it is desirable to use, up to about 15 to 20 parts of reagent on 100 parts of rubber for the hard, grindable product.

The heat-plastic derivatives prepared as herein set forth are found, upon anaylsis after removal of impurities, to be hydrocarbons having the same carbon and hydrogen ratio as in rubber $(C_5H_8)_x$. They are, however, chemically less unsaturated than rubber, as determined, for example, by well known methods of determining the degree of unsaturation of rubber, such as treatment with HCl, HBr, HI, $Br_2$, S, and like substances to form addition products, and by titration in accordance with the so-called Wijs method, using a solution of ICl. By the employment of these methods, the unsaturation of said products was found to vary from about 25%, in the case of some of the brittle, shellac-like products to as much as 67% in the case of some of the tough, balata-like products, as compared with rubber. They are isomers of rubber, using that term in a generic sense as including both polymeric and metameric forms, rather than the more restricted sense in which it distinguishes from a polymer. While it is believed that these products are polymers or depolymers with some of the double bonds of the original rubber internally connected, this cannot be positively asserted inasmuch as the molecular weight of neither rubber nor of these new derivatives is definitely known.

I claim:

1. The method of producing derivatives of rubber which comprises masticating the undissolved rubber with a reagent adapted to convert it into an isomer having less chemical unsaturation than rubber, applying heat, and causing an exothermal reaction between the two, and masticating the product.

2. The method of treating rubber which comprises effecting an exothermal reaction in an undissolved mass of rubber, between the rubber and an isomerizing agent distributed throughout the mass, to the extent of converting the mass into a thermoplastic product, and reworking the product for industrial use without substantially changing its chemical characteristics.

3. The method of treating rubber which comprises working into the undissolved rubber a reagent adapted to convert it into an isomer having less chemical unsaturation than the rubber, heating the rubber under conditions causing it to be changed to a thermoplastic product, and heating and masticating said product to homogenize it.

4. The method of treating rubber which comprises masticating the undissolved rubber with a suitable isomerizing agent, heating the rubber until it has assumed an inelastic, thermoplastic condition, masticating the product to homogenize it, and reworking it for industrial use without substantially changing its chemical characteristics.

5. Method of preparing rubber conversion products, which consists in treating rubber at elevated temperatures with a substance selected from the group consisting of sulfuric acid, organic sulfonic acids, and the corresponding acid chlorides.

6. The method according to claim 2 in which the reagent is a sulfonic compound having the grouping $R-SO_2-X$, wherein R represents an organic radical or a hydroxy group and X represents a hydroxy group or chlorine.

7. The method according to claim 2 in which the reagent is in substantial part, at least, an organic sulfonic acid.

8. The method according to claim 2 in which the reagent is in substantial part, at least, p-phenol sulfonic acid.

9. The method of treating rubber which comprises effecting an exothermal reaction between undissolved rubber and an isomerizing agent distributed throughout the mass, to the extent of converting it into a tough, thermoplastic, balata-like product, and reworking said product without substantially changing its chemical characteristics.

10. The method of treating rubber which comprises effecting an exothermal reaction between undissolved rubber and an isomerizing agent distributed throughout the mass, to the extent of converting it into a coherent, hard, brittle, friable, thermoplastic product.

11. The homogeneous, thermoplastic, artificial isomer of undissolved rubber having less chemical saturation than rubber.

12. The homogeneous, thermoplastic, tough, balata-like, artificial isomer of undissolved rubber having less chemical unsaturation than rubber.

13. The homogeneous, thermoplastic, hard, friable, artificial isomer of undissolved rubber having less chemical unsaturation than rubber.

14. As a new composition of matter, the product of the reaction, under the influence of heat, of an organic sulfonic acid dispersed through a mass of undissolved rubber.

15. As a new composition of matter, the product of the reaction, under the influence of p-phenol sulfonic acid dispersed through a mass of undissolved rubber.

In witness whereof I have hereunto set my hand this 19th day of December, 1924.

HARRY L. FISHER.

Certificate of Correction.

It is hereby certified that in Letters Patent No. 1,605,180, granted November 2, 1926, upon the application of Harry L. Fisher, of Akron, Ohio, for an improvement in "Rubber Isomer and Methods of Producing the Same," an error appears in the printed specification requiring correction as follows: Page 4, line 105, claim 11, for the word "saturation" read *unsaturation;* and that the said Letters Patent should be read with this correction therein that the same may conform to the record of the case in the Patent Office.

Signed and sealed this 18th day of January, A. D. 1927.

[SEAL.]

M. J. MOORE,
*Acting Commissioner of Patents.*